United States Patent [19]

Studer

[11] 4,387,935
[45] Jun. 14, 1983

[54] LINEAR MAGNETIC BEARING

[75] Inventor: Philip A. Studer, Silver Spring, Md.

[73] Assignee: The United States of America as represented by the Administrator of the National Aeronautics and Space Administration, Washington, D.C.

[21] Appl. No.: 214,361

[22] Filed: Dec. 8, 1980

[51] Int. Cl.³ .................................... F16C 39/00
[52] U.S. Cl. ........................ 308/10; 104/282; 104/290; 310/12
[58] Field of Search ............. 308/9, 10, DIG. 1; 318/687; 310/12, 13; 104/281, 282, 290, 292

[56] References Cited

U.S. PATENT DOCUMENTS

| | | | |
|---|---|---|---|
| 3,135,880 | 6/1964 | Olson | 318/687 |
| 3,589,300 | 6/1971 | Wipf | 310/13 |
| 3,638,093 | 1/1972 | Ross | 318/687 |
| 3,741,613 | 6/1973 | Pfaler | 308/10 |
| 3,890,019 | 6/1975 | Boden et al. | 308/10 |
| 4,047,439 | 9/1977 | Russell | 308/10 |
| 4,072,370 | 2/1978 | Wasson | 308/10 |
| 4,128,280 | 12/1978 | Purtschert | 308/9 |

Primary Examiner—R. Skudy
Attorney, Agent, or Firm—John O. Tresansky; John R. Manning; Ronald F. Sandler

[57] ABSTRACT

A linear magnetic bearing includes a stator member (16) stationary relative to x, y and z axes and having a longitudinal axis on the z axis as well as a member (15) longitudinally translatable relative to said axes. The translatable member (15) is controlled to have a longitudinal axis coincident with the z axis. Permanent magnets (36 and 37) on one of the members positions the translatable member (15) in a plane defined by the x-y axes relative to the stationary member (16). The position of the translatable member (15) is sensed by sensors (41 and 42) relative to the stationary member (16) in the plane defined by the x-y axes. Electro-magnets (38 and 39) on one member (23) responds to the sensor (41 and 42) to center the longitudinal axis of the translatable member (15) on the z axis. First low reluctance magnetic flux paths for the permanent magnets (36 and 37) exist through both of the members and a radial air gap (32, 33, 34 and 35) between the members. Second low reluctance magnetic flux paths exist for the electro-magnets through both of the members and a radial air gap (34 and 35) so no net force is applied to the translatable member in the direction of the z axis by either the permanent magnet means or the electro-magnets. The first and second low reluctance flux paths are arranged so that both the electro-magnets and permanent magnets share a common air gap but the electro-magnet fluxes do not pass through the high reluctance permanent magnets. One of the members includes two fixedly spaced elements (23 and 24) along the z axis. Each fixedly spaced element (23 and 24) has four radial pole faces (27, 28, 29 and 30) for the permanent magnet flux paths.

52 Claims, 11 Drawing Figures

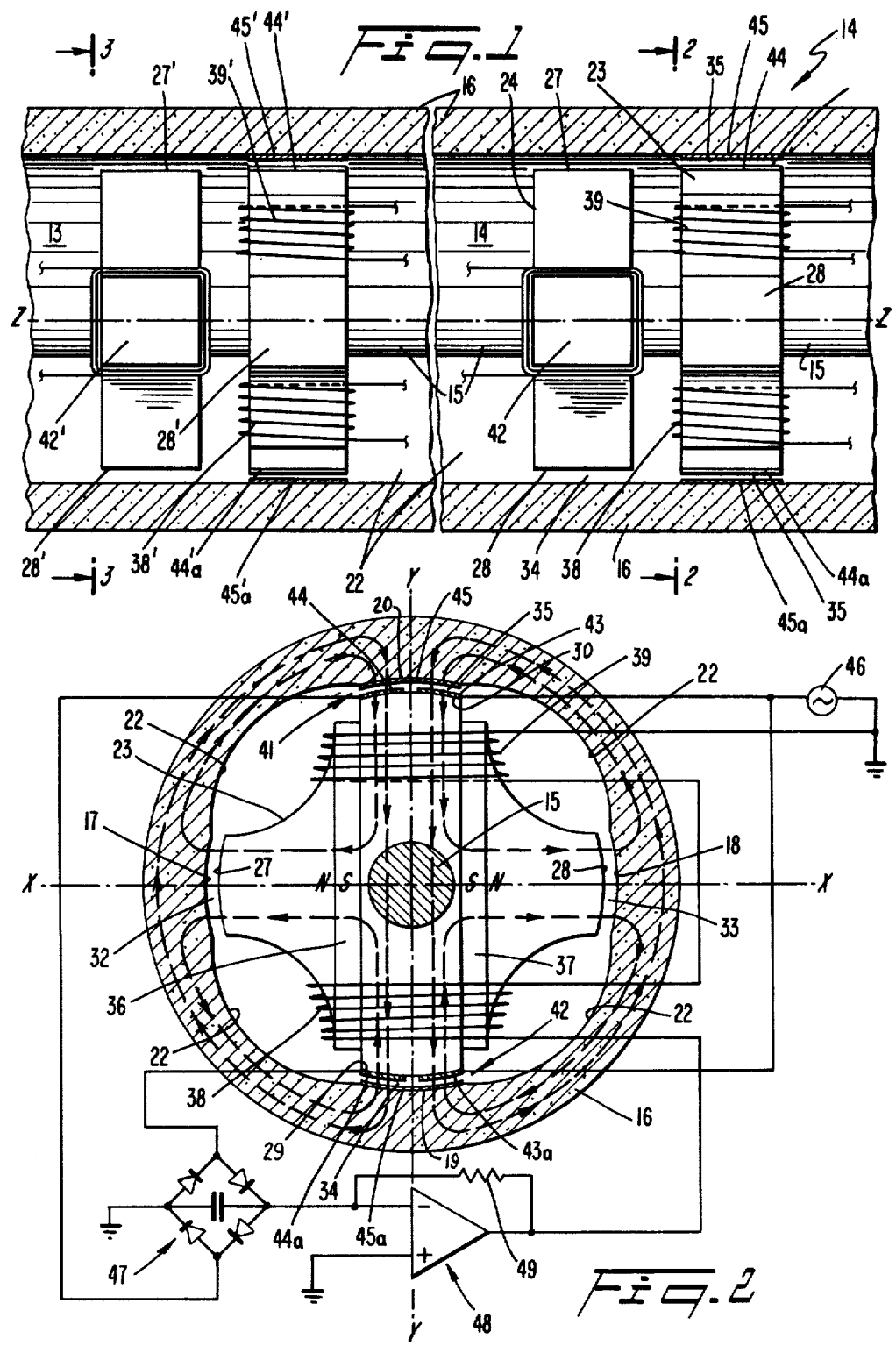

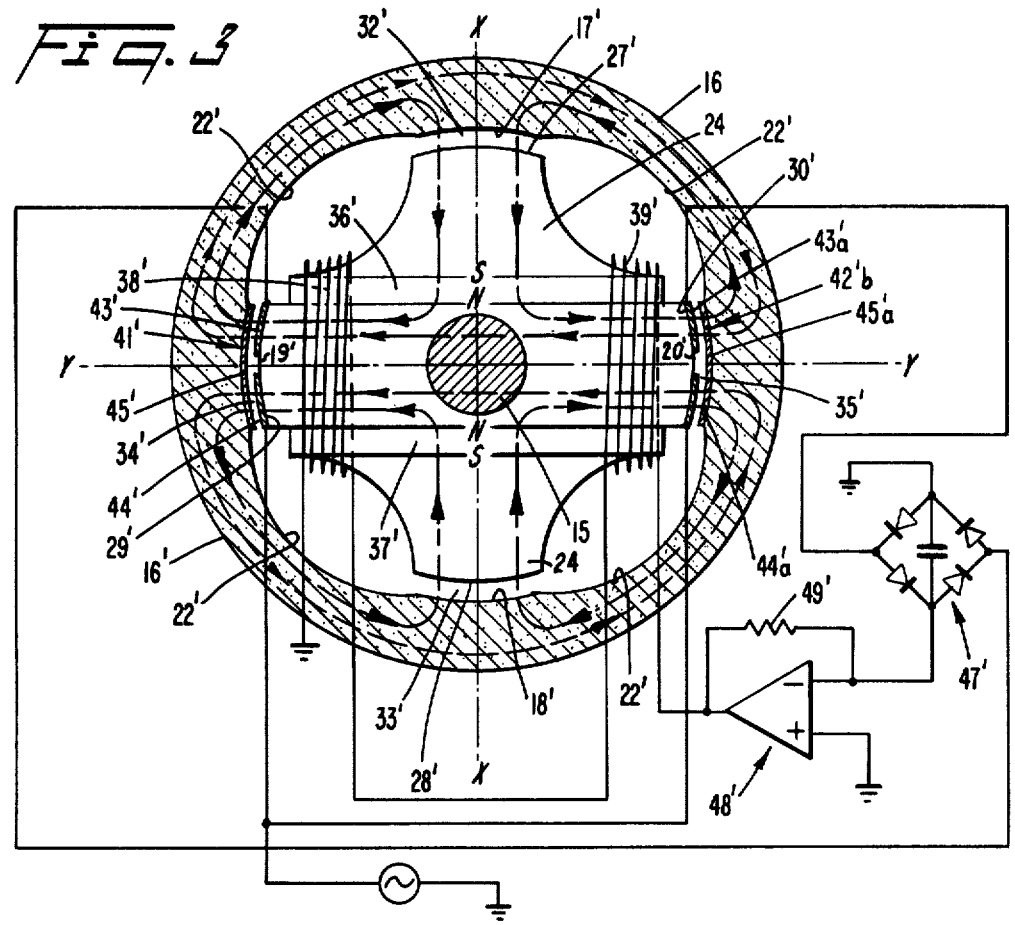
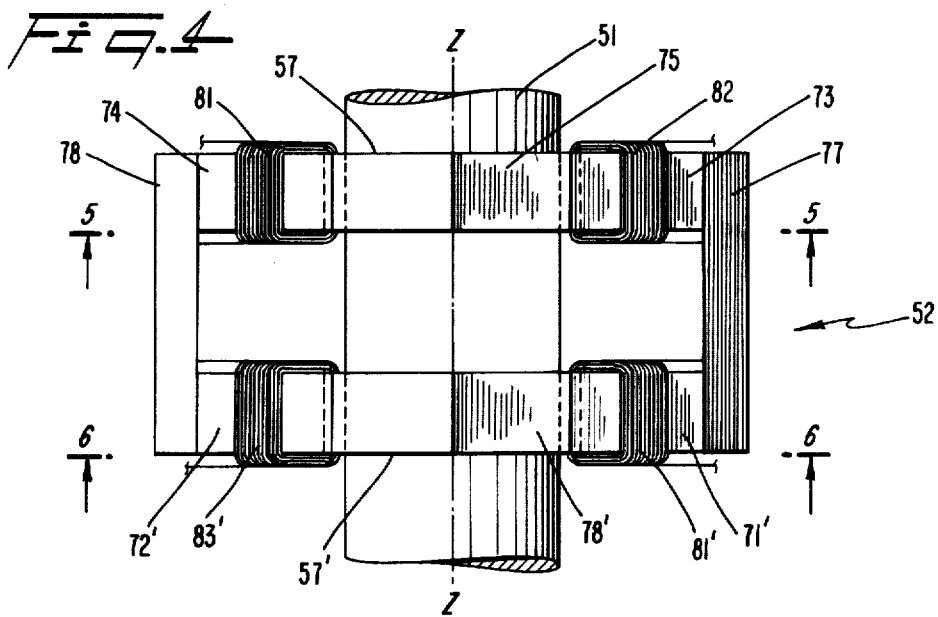

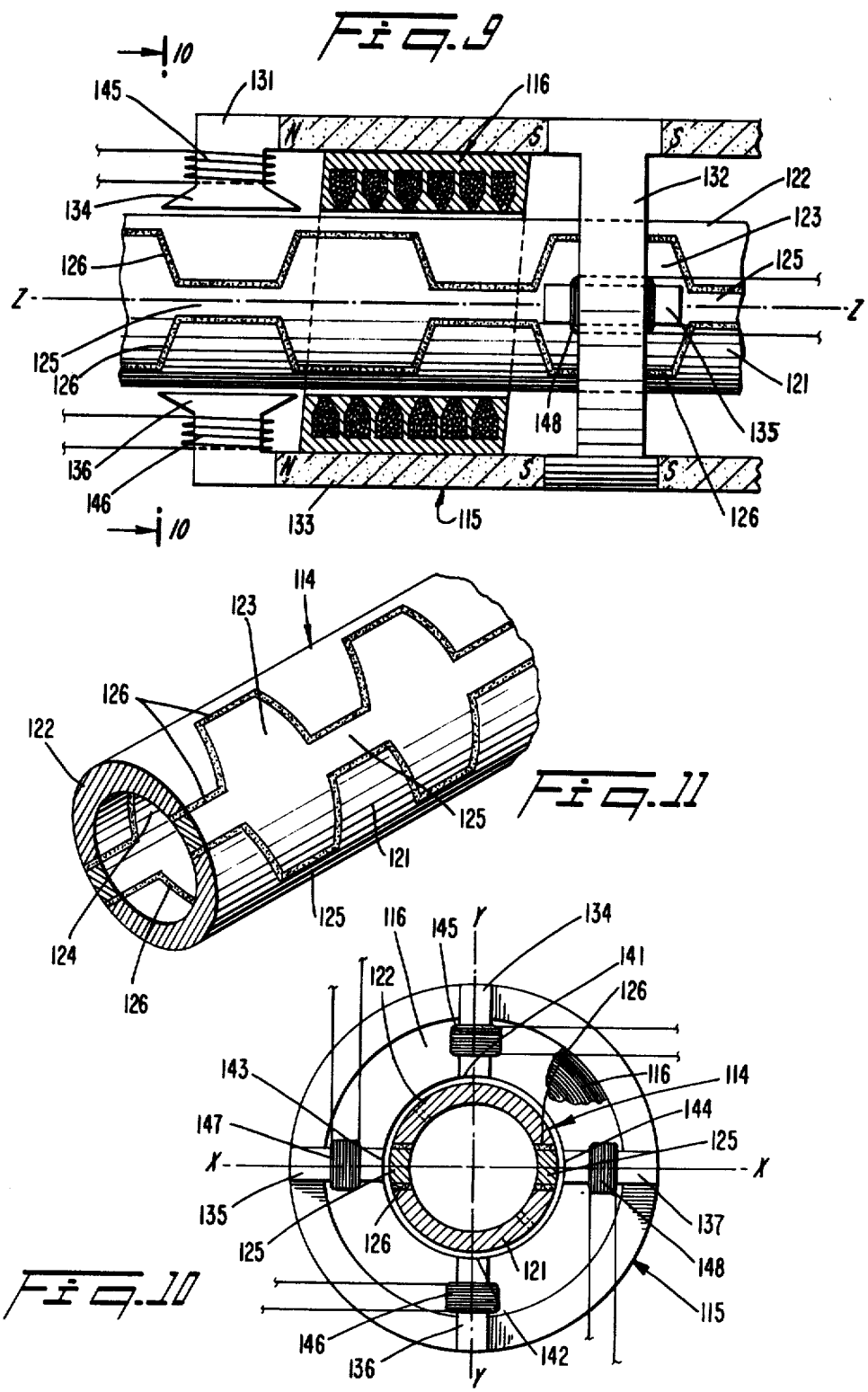

LINEAR MAGNETIC BEARING

ORIGIN OF THE INVENTION

The invention described herein was made by an employee of the U.S. Government and may be manufactured and used by or for the Government for governmental purposes without the payment of any royalties thereon or therefore.

DESCRIPTION

1. Technical Field

The present invention relates generally to magnetic bearings and more particularly to a linear magnetic bearing having permanent and electromagnets for supporting a relatively long element that can be driven along its longitudinal axis, wherein a low reluctance path for the electromagnet by-passes a high reluctance path including the permanent magnet.

2. Background Art

Magnetic bearings are characterized as having three mutually orthogonal degress of freedom, along x, y and z axes. The x and y axes are generally referred to as transverse axes, while the z axis is referred to as the longitudinal axis. A linear magnetic bearing is one that is free to translate along the z axis, i.e., no z axis restoring forces are applied to a movable member relative to a stationary member. Magnetic forces are applied to the movable member to maintain it centrally positioned relative to the stationary member, whereby the z axes of the two members are desirably coincident. Linear magnetic bearings are desirably employed in systems in which a rotor is driven along an elongated path, for example, in connection with systems for moving vehicles along longitudinal tracks.

Rotary magnetic bearings are characterized generally by permanent and electro-magnet circuits. The permanent magnets establish a flux in an air gap between high magnetic permeability movable and stationary members, whereby the two members have a tendency to share an equal longitudinal axis. Sensors for the x and y axes are provided to control fluxes derived in the electro-magnetic circuits. Z axis control can be similarly provided, or can be provided by geometrically arranging pole faces of the stationary and movable members so that a restoring force is applied between the stationary and movable members in the z axis direction.

It is known that it is desirable to provide a low reluctance magnetic path for the electro-magnet circuit such that flux from the electro-magnet does not encounter the permanent magnet; permanent magnets inherently have a high reluctance to the electro-magnet flux. Thus, it is known to provide a low reluctance electro-magnet circuit in shunt with the permanent magnet circuit of a rotary magnetic bearing. By shunting the electro-magnet circuit around and permanent magnet, the amount of power and number of turns required for the electromagnet can be considerably reduced because the electro-magnet circuit can be exclusively through a low reluctance flux path, including a relatively narrow air gap. Despite the known advantages of rotary magnetic bearing systems having the permanent and electro-magnet flux paths in shunt with each other, there apparently have been no linear magnetic bearings developed with this feature.

In the past, linear motion systems have generally employed ball bearings, which provide less frictional linear shaft support than conventional bushings. However, both linear ball bearings and bushings require lubricating oils to achieve reasonable frictional levels and longevity. Linear ball bearings have significantly poorer performance than ball bearings employed in rotary motion. The poor performance of linear ball bearings occurs because an adequate ball retainer has not been developed to prevent the balls from rubbing against each other. In addition, there is a need to provide a non-load bearing recycling path through which the balls must travel along the z axis. Existing linear ball bearings are usually not suited to environments wherein normal lubricants cannot be employed, and where the velocities of the movable elements are very high. High velocities are frequently encountered in connection with high energy devices designed for size reduction or efficiency reasons. While gas bearings overcome some of the problems associated with linear mechanical bearings, gas bearings require a gas supply and are not easily controlled. In addition, gas bearings cannot be employed in certain hostile environments, such as in vacuum, as exists in outer space.

It is, accordingly, an object of the present invention to provide a new and improved linear magnetic bearing and electromotive machine.

Another object of the invention is to provide a new and improved linear magnetic bearing and/or an electromotive machine wherein a relatively low reluctance electro-magnetic flux path is provided in shunt with the permanent magnet flux path.

DISCLOSURE OF THE INVENTION

In accordance with the present invention, a linear magnetic bearing or an electromotive machine including a linear magnetic bearing having mutually orthogonal x, y and z axes comprises a stator member that is stationary relative to the axes and a relatively long member movable relative to the axis, so that the two members are mechanically free of each other. The movable member has a longitudinal axis on the z axis and is controlled so that the long member is centered on the z axis. One of the members includes permanent magnet means for positioning the movable member relative to the stationary member in a plane defined by the x and y axes. A sensor for the movable member position relative to the stationary member in the plane defined by x-y axes controls electro-magnet means on one of the members, to center the longitudinal axis of the movable member on the z axis. A radial air gap is established between the members in the plane defined by the x and y axes. The members include means for establishing first low reluctance magnetic flux paths for the permanent magent means through both of the members and the air gap and second low reluctance magnetic flux paths for the electro-magnet means through both of the members and the air gap so that no net forces are applied to the movable member in the direction of the z axis by either the permanent magnet means or the electro-magnet means, and the movable means is easily translated in the z axis direction. The permanent magnet means has high magnetic reluctance compared to the first and second low reluctance flux paths. The first and second low reluctance flux paths are arranged so that flux from the electromagnet means does not flow through the high reluctance permanent magnet means, i.e., is shunted around the permanent magnet means. Preferably, a plurality of such bearings are provided at spaced points along the z axis.

The above and still further objects, features and advantages of the present invention will become apparent upon consideration of the following detailed description of several specific embodiments thereof, especially when taken in conjunction with the accompanying drawings.

BRIEF DESCRIPTION OF DRAWINGS

FIG. 1 is a side sectional view of one embodiment of the invention;

FIGS. 2 and 3 are cross-sectional views of a pair of elements of the embodiment of FIG. 1, respectively taken along the lines 2—2 and 3—3, wherein the element of FIG. 2 provides control for the y axis, and the element of FIG. 3 provides control for the x axis;

FIG. 4 is a top view of another embodiment of the invention wherein a permanent magnet field is established along the longitudinal axis of the bearing;

FIG. 9 is a cross-sectional view of a linear electromotive machine employing a linear bearing in accordance with the invention;

FIG. 10 is a cross-sectional view, taken through the lines 10—10, FIG. 9; and

FIG. 11 is a perspective view of the salient pole structure in the embodiment of FIG. 9.

BEST MODE FOR CARRYING OUT THE INVENTION

Figure 5:
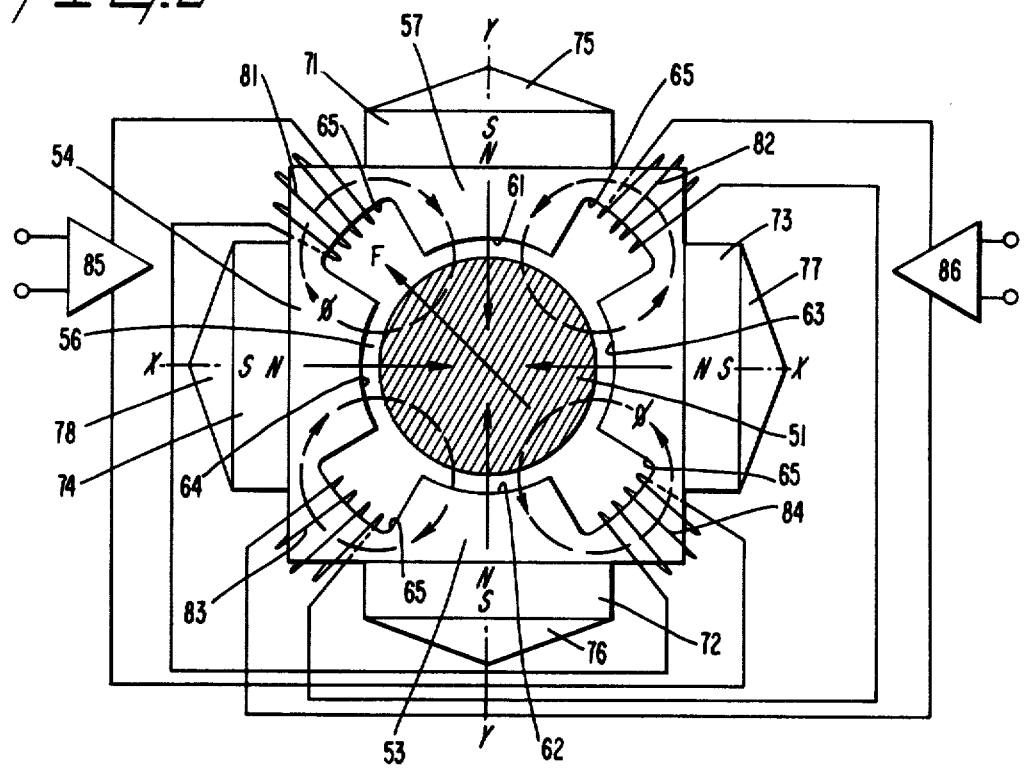
FIGS. 5 and 6 are cross-sectional views, respectively taken through the lines 5—5 and 6—6 of FIG. 4, of the controls in the x and y axes of the movable member in the embodiment of FIG. 4.

Reference is now made to FIGS. 1-3 wherein there is illustrated a linear magnetic bearing assembly 14 having a longitudinal (z) axis and a pair of transverse (x and y) axes. Linear bearing assembly 14 includes internal and external members 15 and 16, respectively. Each of members 15 and 16 is basically fabricated of a material having high magnetic permeability, such as soft iron or ferrite, to minimize eddy current losses. In the specific embodiment of FIGS. 1-3, internal member 15 is fixedly mounted so that it has a longitudinal axis coincident with the z axis. External member 16 is movable relative to internal member 15, but no mechanical connection exists between the two members. External member 16 is controlled so that its longitudinal axis is also coincident with the z axis. In the desired position, both of members 15 and 16 are symmetrical with the z axis. The effective length of members 15 and 16 along the z axis are such that the high magnetic permeability portion of member 16 exceeds the length of the high magnetic permeability portion of member 15. Thereby, movable member 16 is free to translate along the z axis relative to stator member 15.

As viewed in FIGS. 2 and 3, external movable member 16 is of generally cylindrical configuration, having four mutually orthogonal radial pole faces 17, 18, 19 and 20. Pole faces 17 and 18 are diametrically opposed to each other and intersect the x axis on opposite sides of the z axis, while pole faces 19 and 20 are diametrically opposite from each other, on opposite sides of the z axis, and intersect the y axis. Each of pole faces 17-20 has a radius of curvature equal to the radius of the inner perimeter of member 16 from the z axis. Each of pole faces 17-20 has an angular extent of approximately 15 degrees and bisects one of the x or y axes. The inner periphery of element 16, between the edges of adjacent pairs of pole faces, has a smaller radius of curvature than the pole faces, to form surfaces 22. Thereby, there is a greater air gap between surfaces 22 and member 15 than the air gap between pole faces 17-20 and member 15.

Member 15 supports pairs of elements 23 and 24, having high magnetic permeability. Elements 23 and 24 are mechanically connected to each other by a member 15, having no magnetic permeability. Member 15 extends through elements 23 and 24 and is fixedly mounted, whereby member 15 is stationary relative to the x, y and z axes.

Elements 23 and 24 are identical to each other, but are arranged in mutually orthogonal directions, whereby element 23 provides y axis control for the position of movable member 16, while element 24 provides x axis control for the movable element.

As illustrated in FIG. 2, element 23 includes four mutually orthogonal radial pole faces 27-30. Pole faces 27 and 28 diametrically opposite from each other on opposite sides of the z axis, are bisected by the x axis and are in confronting relation with pole faces 17 and 18, respectively. Similarly, pole faces 29 and 30 are diametrically opposed from each other on opposite sides of the z axis, so they are bisected by the y axis and are in confronting relation with pole faces 19 and 20, respectively. Thereby, four mutually orthogonal radial air gaps 32-35 are provided between element 23 and member 16.

In each of the radial gaps 32-33 a permanent magnet flux path is established so that the lines of flux flow outwardly from element 23 into an air gap and thence into member 16. The flux path continues circumferentially for approximately 90 degrees in member 16 to the adjacent pole face of member 16, from which it extends across an air gap back into the pole face of element 23. For example, a permanent magnet flux route exceeds outwardly from pole face 27 through air gap 32 into pole face 17 and extends for approximately 90 degrees through element 16 to pole face 19. From pole face 19, the permanent magnet flux route jumps across air gap 34 into pole face 29. The permanent magnet lines of flux extend for another 90 degrees through element 23 back to pole face 27. A similar permanent magnet flux route subsists from pole face 27 across air gap 32 to pole face 17 and around member 16 to pole face 20, through air gap 35 to pole face 30 and back to pole face 27. Third and fourth permanent magnet flux routes extend out of pole face 28, across air gap 33, to pole face 18. From pole face 18, one permanent magnet flux route extends around element 16 to pole face 19, through air gap 34 to pole face 29 and back to pole face 28. The other permanent magnet flux route traverses member 16 from pole face 18 to pole face 20, and proceeds across air gap 35 to pole face 30 and back to pole face 28. Hence, the permanent magnet flux routes proceed in opposite directions from diametrically opposed pole faces; the permanent magnet flux routes extend outwardly from pole faces 27 and 28, and proceed inwardly into pole faces 29 and 30.

To establish the permanent magnet flux path, element 23 includes two permanent magnets 36 and 37, equally spaced from and parallel to, and on opposite sides of the y axis. Magnets 36 and 37 are positioned so that the polarized faces thereof are displaced along the x axis.

Like polarized faces of magnets 36 and 37 are facing each other so that the magnets have a tendency to repel each other; in the particular configuration illustrated, the south faces of magnets 36 and 37 are closer to the y axis than the north faces. Magnets 36 and 37 have the same width as the base of pole pieces which contain pole faces 27 and 28. Thereby, there is a high reluctance path between adjacent radial pole faces of element 23 through permanent magnet 36 or 37, and no low reluctance path exists between the adjacent pole faces.

To provide vernier, y axis control for member 15, element 23 establishes a second electro-magnet flux path. The electro-magnet flux path is in shunt with permanent magnets 36 and 37 and extends through element 23 between diametrically opposed pole faces 29 and 30. The electromagnet flux path extends from pole face 29 through air gap 34 to pole face 19. The flux path extends circumferentially around member 16 in two shunt paths, so that one path is in the clockwise direction and the other path is in the counterclockwise direction. The clockwise and counterclockwise electro-magnet paths through member 16 converge on pole face 20, cross air gap 35, and continue through pole face 30. From pole face 30, the electro-magnet flux path flows diametrically through element 23 back to pole face 29. The electro-magnet flux does not flow to pole faces 27 and 28 because of the high reluctance of permanent magnets 36 and 37. The electro-magnet fluxes in air gaps 34 and 35 are similarly directed so that the flux in one of the air gaps is in series aiding relation with the permanent magnet flux but is in series bucking relation with the permanent magnet flux in the other air gap. Thereby, by controlling the magnitude and direction of the electro-magnet current flow in coils 38 and 39, the position of movable member 16 relative to the y axis can be controlled.

Control of the magnitude and direction of the electro-magnet flux is attained by winding coils 38 and 39 on element 23 so that the coils have longitudinal axes coincident with the y axis. Coils 38 and 39 are equally spaced from the x axis, and are respectively adjacent opposed pole faces 29 and 30. Coils 38 and 39 are interconnected with each other so that the electro-magnet fluxes established in them are in series aiding relation. The magnitude and polarity of the current supplied to coils 38 and 39 are such that air gaps 34 and 35 are of equal length.

To control the electro-magnetic flux derived from coils 38 and 39, a y position sensor is provided. In a preferred embodiment, the y position sensor includes a pair of metallic, non-inductive capacitor plates 44 and 44a mounted on pole faces 30 and 29, respectively, form electrodes of a capacitive bridge network energized by an alternating current source 46 connected to plates 43 and 43a. Plates 44 and 44a are coupled to sources 43 and 43a, respectively, via stationary plates 45 and 45a to a degree depending inversely upon the relative spacing of gaps 41 and 42. Plates 44 and 44a are connected to a diode demodulator network 47 and then to amplifier 48 at its inverting terminal. A feedback resistor 49 is coupled across the inverting and output ports of amplifier 48. Amplifier 48 responds to the differential voltage developed at its input terminals to derive a bipolar DC output voltage having a magnitude and polarity indicative of the current required by electro-magnet coils 38 and 39 to maintain member 16 symmetrically centered on the x axis, i.e., to provide y axis control. The DC output voltage of amplifier 48 is coupled in series to windings 38 and 39 so that the current supplied to both windings has the same amplitude and current. Because the windings are wound in the same direction, the fluxes from the two windings are in series aiding relation.

Reference is now made to FIGS. 3 of the drawing wherein there is illustrated a cross-sectional view of element 24 and the structure of member 16. Element 24 provides x axis control of member 15. The structure of element 24 is identical to that of element 23 except that the two elements are oriented at 90 degrees relative to each other. Corresponding elements in FIGS. 2 and 3 have corresponding reference numerals, except that the elements of FIG. 3 are primed.

Hence, the permanent magnet flux routes in FIG. 3 are polarized oppositely from those of FIG. 2. In particular, permanent magnet flux in FIG. 3 flows outwardly from diametrically opposed y pole faces 29' and 30', across y axis air gaps 34' and 35' into y axis pole faces 19' and 20'. From pole faces 19' and 20', the permanent magnet flux routes extend in clockwise and counterclockwise directions to pole faces 17' and 18'. From pole faces 17' and 18', the permanent magnet flux routes extend through air gaps 32' and 33' into pole faces 27' and 28', respectively. From pole faces 27' and 28', the permanent magnet flux routes extend through element 24 back to pole faces 29' and 30'. Thereby, the permanent magnet fluxes emanating from the y axis pole faces of element 24 are polarized the same as the permanent magnet fluxes emanating from the y axis pole faces of element 23. Similarly, the x axis permanent magnet fluxes derived from the pole faces of elements 23 and 24 are similarly directed. The vernier fluxes provided by the electro-magnets on elements 23 and 24 do not have sufficient magnitude to permanently affect the polarizations of the permanent magnet flux paths, so that the linear bearing in the embodiment of FIGS. 1-3 is attained regardless of the electro-magnet forces required to stabilize member 16 onto the z axis centerline.

To control the electromagnetic flux derived from coils 38' and 39', a y position sensor including plates 44' and 44a' is mounted on poles 30' and 29'. These plates form the electrodes of a capacitive bridge network energized by alternating current source 46' which is connected to plates 43' and 43a'. Plates 44' and 44a' are coupled to sources 43' and 43a' by stationary plates 45' and 45a' to a degree depending inversely on the relative spacing of gaps 41' and 42'. Plates 44' and 44a are connected to a diode bridge network 47' and thence to an inverting terminal of amplifier 48' in common with a feedback resistor 49'. A variable voltage, indicative of the portion of member 16 relative to fixed element 23' in the y-axis direction, is thereby supplied to amplifier 48. Amplifier 48 responds to the differential voltage developed at its input terminals to produce a bipolar constant output voltage polarity indicative of the current required by electromagnet coils 39' and 38' to maintain member 16 centered on the x-axis. The current from amplifier 48' is coupled in series to windings 38' and 39' to produce a series aiding flux.

Figure 6:
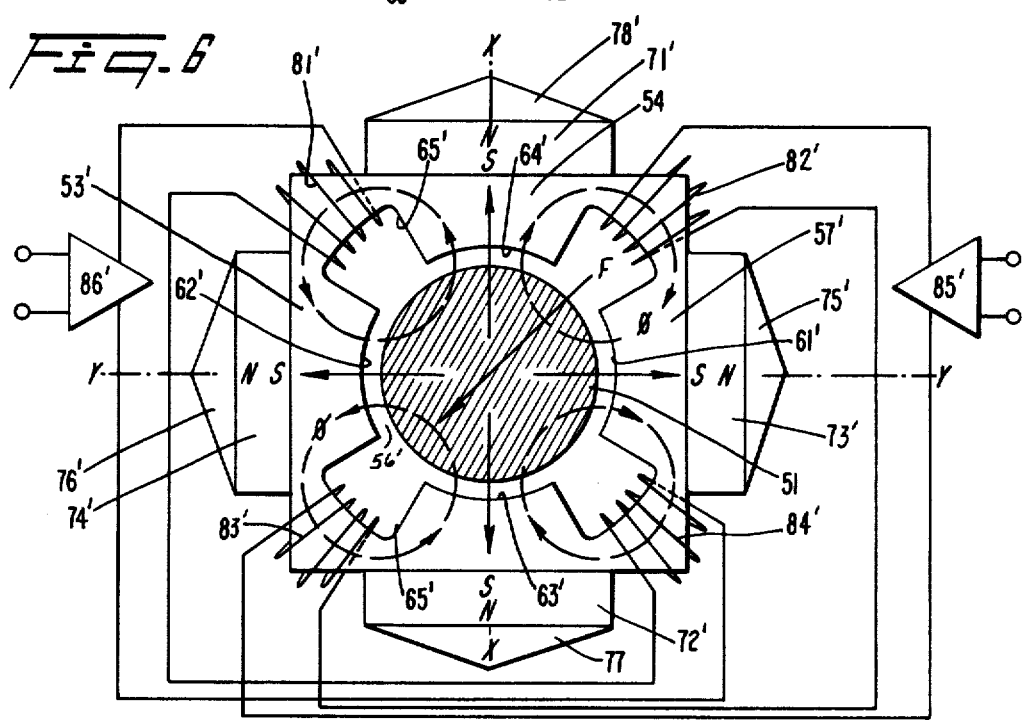

Reference is now made to FIGS. 4–6 wherein there is illustrated a further embodiment of the invention. The second embodiment includes an internal, cylindrical movable member 51, made of a high magnetic permeability material, and having a longitudinal axis which is desirably positioned on the z axis of the magnetic bearing system. A stator member 52 external to and surrounding movable member 51 includes permanent and electro-magnets which enable the movable member to be centered on the z axis and to allow the movable member to be freely translatable in the z axis direction.

Stator member 52 includes a pair of generally high magnetic permeability elements 53 and 54, fixedly located relative to each other, in parallel x-y planes, at right angles to the z axis. A z axis permanent magnet flux is established between elements 53 and 54 by permanent magnets included on the elements and high magnetic permeability bridges 75, 76, 77 and 78. Bridges 75, 76, 77 and 78 mechanically and magnetically connect elements 53 and 54 together, and run parallel to cylinder 51. To enable cylinder 51 to be freely positioned along the z axis so that no restoring forces are applied to the cylinder, the cylinder has a length in excess of the distance separating remote faces of elements 53 and 54. The z axis permanent magnet flux flowing between elements 54 and 53, through bridges 75, 76, 77 and 78 flows radially through the elements to radial air gaps 56 between each of the elements and member 51 and then traverses member 51 in the z axis direction and flows radially outwardly through the air gap back to the other element of member 54. Electromagnet flux coupled from element 54 to member 51 controls the x and y axis position of member 51 by means of controlled bidirectional currents operating in coils 81 and 84 and in coils 82 and 83 which, when oppositely displaced, generate forces F diagonally to the x and y axes, thereby creating a net restoring force tending to maintain cylinder 51 centered along the z-axis. Similarly, coils 81', 84' and 82', 83' center cylinder 51 at a plane axially separated from element 54. Coils 81 through 84 and 81' through 84' are wound in cut-outs 65 and 65'. The bidirectional currents in the coil pairs are controlled in magnitude and polarity by electronic amplifiers 85, 86 and 85', 86' which, in turn, are controlled by electronic position sensors to maintain a null centered condition for the moving element.

Consideration is now given to the structure of element 54 by referring to FIG. 5. Element 54 includes a high magnetic permeability pole piece 57, having four mutually orthogonal arcuate pole faces 61-64. Each of pole faces 61-64 has the same angular extent.

It is to be understood that the structure of FIGS. 4-6 can be modified by replacing the eight permanent magnets 71-74 and 71'-74' and bridges 75-78 with a single cylindrical permanent magnet having opposite pole faces aligned with the facing edges of elements 53 and 54 or with a cylindrical permanent mechanically secured to high magnetic permeability cylinders.

Figure 7:
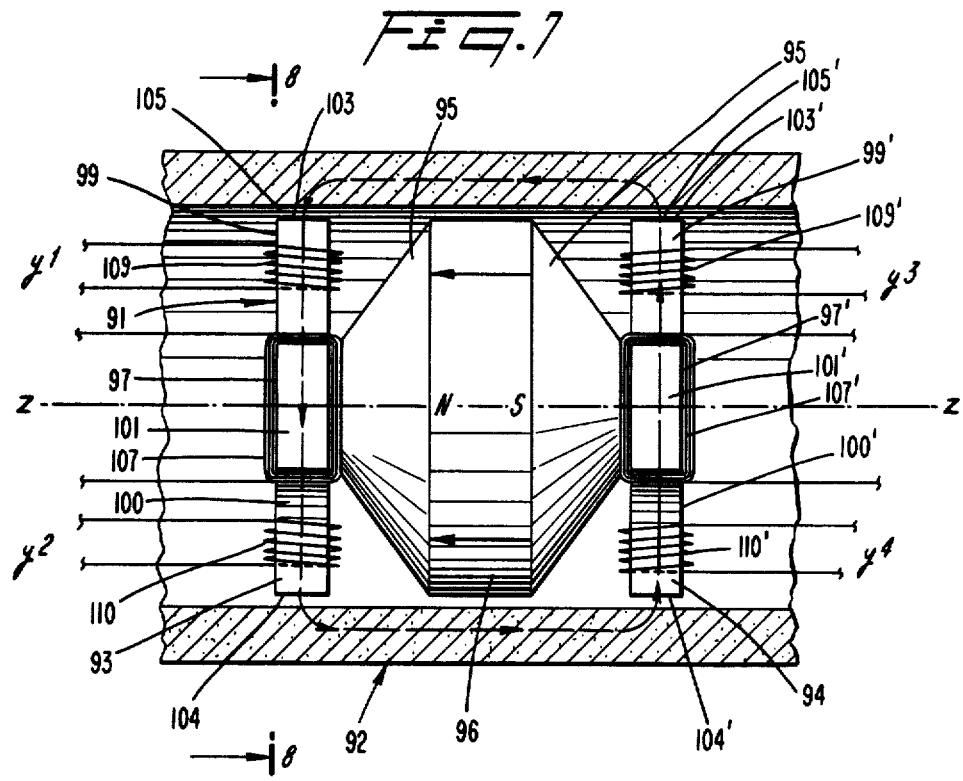
FIG. 7 is a side sectional view of another embodiment of the invention wherein a permanent magnet flux is established along the z axis in a member internal to an elongated cylinder.
Figure 8:
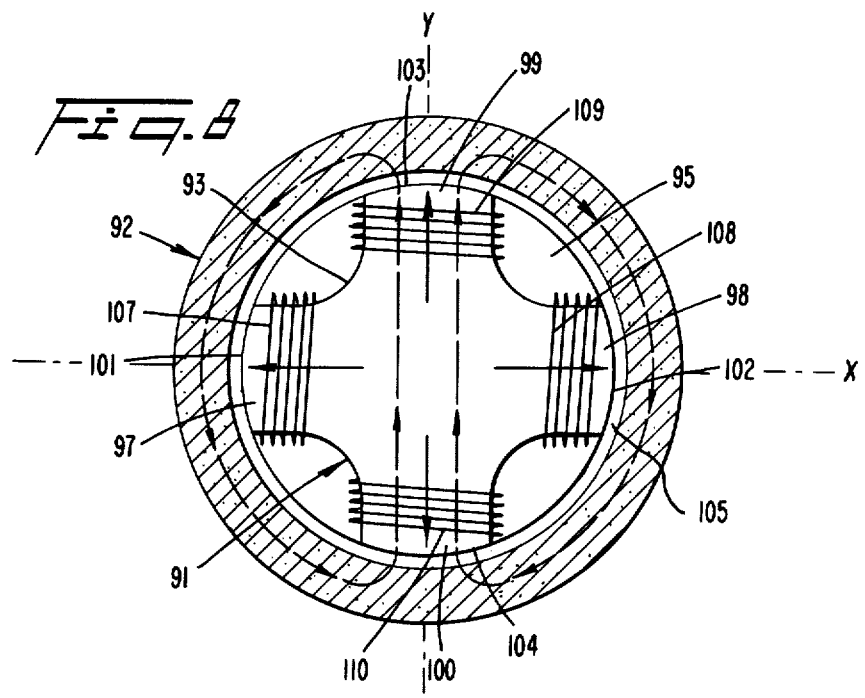
FIG. 8 is a cross-sectional view, taken through the lines 8—8 of FIG. 7.

Reference is now made to FIGS. 7 and 8 wherein there is illustrated a further embodiment of the invention having an internal stator structure 91 surrounded by a cylindrical movable member 92. Stator member 91 is fixedly mounted so that it is centered on the z axis and includes permanent and electro-magnet means to center elongated cylinder 92 on the z axis. Member 92 is freely movable in the z axis direction but is controlled in the x and y axes to be centered on the z axis. A plurality of similar stators (not shown), located at spaced points along the length of elongated cylinder 92, are fixedly connected to each other by a non-magnetic post to control the position of the cylinder. Because all of the stators are of substantially the same construction, the description of stator 92 suffices for all of the stators.

Element 91 includes two fixedly spaced, high magnetic permeability elements 93 and 94, spaced from each other in parallel x-y planes along the z axis. Elements 93 and 94 are joined to each other by a pair of high permeability frusto-conical segments 95 having small bases connected to the elements and large bases connected to oppositely polarized faces of disc permanent magnet 96. Permanent magnet 96 is polarized in the z axis direction, with the north and south poles thereof being respectively adjacent elements 93 and 94. Permanent magnet flux flows from the north pole of permanent magnet 96 through high magnetic permeability segment 95 to element 93 in the z direction. In element 93, the permanent magnet flux flows outwardly, in a radial direction through four radially extending arms 97-100, respectively having radial pole faces 101-104. Diametrically opposed radial pole faces 101 and 102 are bisected by the x axis, while diametrically opposed radial pole faces 103 and 104 are bisected by the y axis. The permanent magnet flux flowing out of pole faces 101-104 jumps a radial air gap 105 to cylindrical outer member 92. The permanent magnet flux flows longitudinally through member 92 in the z axis direction until it encounters a second radial air gap 105 which surrounds element 94. Element 94 is similar to element 93 since both include four mutually orthogonal radially extending arms having radial pole faces centered on the x and y axes. Corresponding members of elements 93 and 94 have corresponding reference numerals, except that the reference numerals of element 94 are primed.

The permanent magnet flux which crosses air gap 105' flows radially through pole faces 101' through 104' (only pole faces 103' and 104' are shown) in FIG. 7 into radially extending arms 97'-100' (only arms 99' and 100' are shown) in FIG. 7. The permanent magnet flux flows back to the south pole of permanent magnet 96 through frusto-conical segment 95 which is between the permanent magnet 96 and element 94. Because element 92 is longer than the remote parallel faces of elements 93 and 94, member 92 is free to translate in the z axis direction relative to stator member 91.

To provide control of member 92 in the directions of the x and y axes relative to the z axis, each of elements 93 and 94 includes a separate coil on each of the radially extending arms, whereby coils 107-110 and 107'-110' are respectively provided on arms 97-100 and 97'-100'. Coils 107, 108, (not shown in FIG. 7) 107' and 108' provide control of member 92 in the x axis direction, while coils 109, 110, 109' and 110' provide control of member 92 in the y axis direction. X axis coils 107 and 108 on element 93 are series connected with each other and are responsive to a first DC current, having an amplitude and polarity necessary to center member 92 on the y axis in the x-y plane of element 93. Similarly, x axis coils 107' and 108' on element 94 are series connected with each other and are responsive to a second DC current to center member 92 on the y axis in the plane of element 94 to provide angular stability for the position of rotor 92. X axis coils 109 and 110 are series connected with each other and are responsive to a third DC current having a magnitude and polarity necessary to control the position of movable member 92 so it is centered on the x axis in the x-y plane of element 93; coils 109' and 110' are also series connected and responsive to a fourth DC current having a magnitude and polarity to control the position of member 92 so it is centered in the plane of element 94. The magnitude and polarity of the currents supplied to the electro-magnet coils in the x and y direction are determined by separate x and y position sensors for member 92 relative to member 91, in the planes of elements 93 and 94; such sensors are preferably as described supra with regard to the embodiment of FIGS. 1–3.

Coils 107 and 108, for x axis control, are wound on element 93 so that the electro-magnet fluxes derived from them are in series aiding relation; similarly coils 107' and 108' on element 94 are wound in series aiding relation. The magnetic fluxes derived from coils 107 and 108 flow in element 91 in the same direction as the direction in which the electro-magnet fluxes of element 94 flow in response to energization of coils 107' and 108'. Thereby, the x axis vernier control electro-magnet fluxes of elements 93 and 94 provide twice the x axis restoring force of each acting separately. A similar winding relationship is provided for y axis coils 109 and 110, on element 93 and coils 109' and 110' on element 94.

The x axis electro-magnet flux in element 93, for example, may flow from right to left as viewed in FIG. 8. The electro-magnet x axis flux thereby flows radially across air gap 105 in series relation with the permanent magnet flux. After jumping the air gap the x axis electro-magnet flux splits into a pair of parallel paths and flows circumferentially around member 92 until it recrosses air gap 105 in opposition to the permanent magnet flux and traverses pole face 102 of arm 98. The electro-magnet flux for the x axis continues through element 93 along and parallel to the x axis and again traverses arm 97 until it reaches pole face 101 and air gap 105. Thereby, the electro-magnet flux is in bucking relation with the permanent magnet flux as it traverses air gap 105 from member 92 into pole face 102. To produce force in the same direction in element 94, the x axis electro-magnet pole flux flows from left to right, as viewed from the direction of FIG. 8 for this example because the permanent magnet flux is inwardly directed in the plane of element 94. The electro-magnet fluxes from elements 93 and 94 do not flow in the z direction along member 92 because there is no low reluctance path back to the origin of the electro-magnet flux through element 91 because of the high reluctance of permanent magnet 96. Thereby, the linear bearing attributes of the device are attained.

Reference is now made to FIGS. 9–11 wherein there is illustrated an embodiment of the invention wherein the magnetic bearing of FIGS. 4–6 is modified so that it is incorporated in a linear electromotive machine, in the form of a motor. The linear motor includes an internal movable member 114 and an external stator member 115 which surrounds the movable member. External member 115 includes electro-magnets and permanent magnets which control the position of movable member 114 to enable the movable member to be desirably positioned so that its longitudinal axis is coincident with the z axis of the machine, and about which external member 115 is centered. The electro- and permanent magnets on member 115 enable member 114 to move freely in the z axis direction, to establish the linear bearing. Movable member 114 is translated in the z axis direction in response to magnetic flux derived from commutated winding 116 which is fixedly mounted to member 115 so it surrounds member 114. Winding 116 is provided with three or more sets of coils which are alternately supplied with commutated current to drive member 114 in the z direction. Commutation of the current in the coils of winding 116 is in response to the position of movable member 114 in the z axis direction, as sensed either photoelectrically, magnetically or capacitively. Commutation of the current in the coils of winding 116 is provided in the conventional manner. The flux derived from the commutated winding 116 interacts with flux supplied by member 115 to member 114.

Member 114 includes four mutually orthogonal curved low magnetic reluctance pole pieces 121–124, each of which has four salient poles in displaced x-y planes along the z axis. Each of the salient poles is shaped somewhat like a crown, with the pair of salient poles in any particular pole piece extending in opposite directions through the same distance from the x or y axis. The salient pole pieces are connected together by longitudinally extending bridges 125. Bridges 125 on oppositely disposed pole pieces 121 and 122 are aligned relative to each other in the z direction, as are the salient poles. Bridges 125 of pole pieces 121 and 122 extend parallel to and adjacent the salient poles of elements 123 and 124. Hence, there is a tooth-like relation between the bridges of elements 121 and 122 and the poles of elements 123 and 124 along the z axis direction. Elements 121–124 are fixedly mounted relative to each other by dielectric 126 which is bounded to opposing faces of the elements, and which therefore forms air gaps between opposed edges of the salient poles of the differing pole pieces 121–124. The salient pole arrangement is conventional, except that the pole pieces of the present invention are arranged in linear array instead of circular as is the conventional manner, and mounted in back-to-back relation to each other to form one of the elements 121–124 of the present invention.

External member 115 includes a pair of elements 131 and 132 in parallel x-y planes displaced along the z axis. Elements 131 and 132 are mechanically connected to each other by a cylindrical permanent magnet 133 having north and south poles spaced from each other along the z axis direction. The magnetic flux from permanent magnet 133 flows radially through two mutually orthogonal radially extending arms 134 and 136 of element 131 and through two mutually orthogonal radially extending arms 135 and 137 of element 132 which is staggered 90 degrees from element 131. Each of arms 134 through 137 has a radial pole face 141–144, respectively bisected by the y and x axes. Thereby, magnetic flux from element 131 is coupled into two elements 122 and 125 regardless of the axial position of member 114 relative to member 115. The permanent magnet flux flowing out of radial arms 134 and 136 of element 131 flows axially in the two elements 121 and 122 of member 114. The permanent magnet flux thereby jumps radially directed air gaps between the salient poles of elements 121 and 122 and interacts with the commutated flux induced in elements 121 and 122 by winding 116, to provide z axis motion of member 114. Similar flux paths are established for elements 132 vis-a-vis elements 123 and 124. The permanent magnet flux flowing out of radial arms 135 and 137 of element 132 flows axially in elements 123 and 124 of member 114. The permanent magnet flux thereby jumps radially directed air gaps between salient poles of element 123 and 124 to interact with commutated flux induced in elements 123 and 124 by winding 116 to provide added z axis motion of member 114.

Member 114 is centrally positioned so that its longitudinal axis is coincident with the z axis in response to vernier electro-magnet forces established by elements 131 and 132 in the x and y axis directions. To this end, diametrically opposed arms 134 and 136 are respectively provided with electro-magnet coils 145 and 146 while arms 135 and 137 are provided with coils 147 and 148. The y axis control coils of element 131 are series connected to each other and are responsive to an error signal indicative of the deviation of member 114 from the z axis in the y direction. Coils 147 and 148 of element 132 are series connected with each other and are responsive to a DC current having a magnitude and polarity indicative of the x axis position of element 114. The x and y axis coils on elements 131 and 132 are wound and controlled in the same manner as described supra with regard to the corresponding coils on elements 93 and 94 in the embodiment of FIG. 7. The electro-magnet fluxes supplied by elements 131 and 132 to member 114 flow circumferentially in member 114, rather than transversely of the member, because of the high magnetic reluctance of permanent magnet 133. Thereby, the bearing structure has no effect on the z axis position of movable member 114. Member 114 is therefore easily translated in the z axis direction in response to the interaction between the commutated magnetic flux induced by winding 116 in element 114 and the permanent magnet flux flowing from permanent magnet 133 in the z axis direction of member 114.

While there have been described and illustrated several specific embodiments of the invention, it will be clear that variations in the details of the embodiments specifically illustrated and described may be made without departing from the true spirit and scope of the invention as defined in the appended claims.

We claim:

1. A linear magnetic bearing or an electromotive machine including a linear magnetic bearing, said bearing having mutually orthogonal x, y and z axes and comprising a stator member stationary relative to said axes and having a longitudinal axis on the z axis, a member movable relative to said axes, said members being mechanically free of each other, said movable member adapted to have a longitudinal axis along the z axis, permanent magnet means on one of said members for positioning the movable member in a plane defined by the x-y axes relative to the stationary member, means for sensing the position of the movable member relative to the stationary member in the plane defined by the x-y axes, electro-magnet means on one of said members responsive to the sensing means for centering the longitudinal axis of the movable member on the z axis, a radial air gap being established between said members in the plane defined by the x-y axes, said members including means for establishing first low reluctance magnetic flux paths for the permanent magnet means through both of the members and the air gap and second low reluctance magnetic flux paths for the electro-magnets through both of the members and the air gap so that no net force is applied to the movable member in the direction of the z axis by either the permanent magnet means or the electromagnet means, said permanent magnet means having high magnetic reluctance compared to the flux paths, said first and second low reluctance flux paths being arranged so that flux from the electro-magnet means do not pass through the permanent magnet means.

2. The magnetic bearing of claim 1 wherein a first of the members includes a pair of low reluctance elements fixedly mounted to and fixedly spaced from each other along the z axis in a pair of parallel x-y planes, said low reluctance members being parts of the first and second flux paths so that both of the elements are centered on the z axis, a second of said members having high magnetic permeability between and on opposite sides of the pair of elements.

3. The magnetic bearing of claim 2 wherein said first flux paths include at least three pole faces on each of the elements, whereby at least three radially extending permanent magnet flux routes are provided between each of the elements and the second member.

4. The magnetic bearing of claim 3 wherein the second flux paths include a pair of diametrically opposed pole faces on each of the elements whereby diametrically opposed radially extending electro-magnet flux routes are provided between each of the elements and the second member.

5. The magnetic bearing of claim 4 wherein a first pair of opposed pole faces on one of the elements intersects the x axis and a second pair of opposed pole faces on another of the elements intersects the y axis.

6. The magnetic bearing of claim 5 wherein the second flux paths on the one element include only the pole faces intersecting the x axis and the second flux paths on the other element include only the pole faces intersecting the y axis.

7. The magnetic bearing of claim 4 or claim 5 or claim 6 wherein the first flux paths on each element include permanent magnet flux routes extending from one of said pole faces through the second member to the pair of diametrically opposed pole faces on the second flux path.

8. The magnetic bearing of claim 4 wherein the first flux paths on each element include permanent magnet flux routes extending from one of said pole faces through the second member to the pair of diametrically opposed pole faces in the second flux path and each element includes four mutually orthogonal pole faces, a diametric pair of said faces being provided only for the second flux paths, all of said faces being provided for the first flux paths so that permanent magnet flux routes exist between adjacent pairs of said faces and a portion of said second member.

9. The magnetic bearing of claim 8 wherein the diametric pair of pole faces on one element is oriented along the x axis and the diametric pair of pole faces on the other element is oriented along the y axis.

10. The magnetic bearing of claim 8 or claim 9 wherein each element includes a pair of permanent magnets diametrically polarized on the element at right angles to the diametrically opposed pole faces of the second flux paths, said pair of permanent magnets being located on opposite sides of the z axis and polarized so they tend to repel each other, whereby each permanent magnet establishes separate flux routes.

11. The magnetic bearing of claim 8 or claim 9 wherein each element includes a pair of electro-magnets diametrically polarized on the element in alignment with the diametrically opposed pole faces of the second flux paths, said pair of electro-magnets being located on opposite sides of the z axis and polarized so they are in series aiding relation for the flux of the second paths.

12. The magnetic bearing of claim 8 or claim 9 wherein each element includes a pair of permanent magnets diametrically polarized on the element at right angles to the diametrically opposed pole faces of the second flux paths, said pair of permanent magnets being located on opposite sides of the z axis and polarized so they tend to repel each other, whereby each permanent magnet establishes separate flux routes, a pair of electro-magnets diametrically polarized on the element in alignment with the diametrically opposed pole faces of the second flux paths, said pair of electro-magnets being located on opposite sides of the z axis and polarized so they are in series aiding relation for the flux of the second paths.

13. The magnetic bearing of claim 3 or claim 4 or claim 5 or claim 6 or claim 7 wherein the first flux path and the permanent magnet means include means for establishing a permanent magnet flux route in the direction of the z axis from one of the elements through the air gap to the other of the elements.

14. The magnetic bearing of claim 2 wherein the first flux path and the permanent magnet means include means for establishing a permanent magnet flux route in the direction of the z axis from one of the elements through the air gap to the other of the elements.

15. The magnetic bearing of claim 14 wherein each of the elements includes a first pair of diametrically opposed radial pole faces, the first diametric pole faces on one of the elements being oriented on the x axis, the first diametric pole faces on the other element being oriented on the y axis, the diametric pole faces being part of the second flux paths; the permanent magnet means, the electro-magnet means, the first and second elements and the first and second members being arranged so that (a) the first and second flux paths are at right angles in the x-y planes of the elements, and (b) the second flux path, while in the second member, is in the x-y planes of the elements.

16. The magnetic bearing of claim 15 wherein the first and second elements have high magnetic permeability and surround the second member in the two parallel x-y planes, the electro-magnet means including four coils spaced approximately ninety degrees from each other on each element in the x-y plane, the flux derived from first and second adjacent ones of said coils on each element being in series aiding relation, the flux derived from the third and fourth adjacent ones of said coils on each element being in series aiding relation, the flux derived from the first and third adjacent ones of said coils being in series bucking relation, the flux derived from the second and fourth ones of said coils being in series bucking relation.

17. The magnetic bearing of claim 14 wherein each of the elements includes first and second pairs of diametrically opposed radial pole faces respectively intersecting the x and y axes, the electro-magnet means including a coil for each of the pole faces, the flux derived from the coils for each pair of diametrically opposed pole faces being in series aiding relation, the electro-magnet flux derived from the coils for the diametrically opposed pole faces along one axis of one element being in series aiding relation with the permanent magnet flux the one element, the electro-magnetic flux derived from the coils on the diametrically opposed pole faces along said one axis of a second element being in series bucking relation with the permanent magnet flux in the second of the elements.

18. The magnetic bearing of claim 17 wherein the permanent magnet means comprises a permanent magnet mounted on the first member with opposed first and second permanent magnet pole faces longitudinally disposed along the z axis, said first and second elements being located on opposite sides of said permanent magnet pole faces.

19. The magnetic bearing of claim 18 wherein the first member is concentric with and inside of the second member.

20. The magnetic bearing of claim 18 wherein the first member is concentric with and outside of the second member.

21. The magnetic bearing of claim 18 or claim 19 further including winding means for including alternating longitudinal flux in poles of the second member, said induced flux interacting with flux derived from the magnet means to drive one of said members along the z axis.

22. The magnetic bearing of claim 18 further including commutated winding means for inducing alternating longitudinal flux in poles of the second member, said induced flux interacting with flux derived from the magnet means to drive one of said members along the z axis.

23. The magnetic bearing of claim 22 wherein the second member includes four mutually orthogonal high permeability elements having circumferential and longitudinal air gaps and salient poles in x-y planes displaced along the z axis, first and second opposed facing pairs of said salient poles being on opposite sides of the x axis in a first x-y plane, the first and second pairs being on opposite sides of the z axis, third and fourth opposed facing pairs of said salient poles being on opposite sides of the y axis in a second x-y plane, the third and fourth pairs being on opposite sides of the z axis, the salient poles being arranged so that flux is coupled between adjacent salient poles of the first and second x-y planes in the z axis direction.

24. The magnetic bearing of claim 23 wherein each of the elements having salient poles includes longitudinally extending bridges between the x-y planes including the salient poles, the first member having four mutually orthogonal pole faces extending in the z axis direction for a distance equal to the salient pole face length in the z axis plus one half of the bridge length.

25. The magnetic bearing of claim 23 wherein the first member is concentric with and outside of the second member.

26. The magnetic bearing of claims 1, 2, 3, 4, 5, 6, 7, 8, 9, 14, 15, 16, 17, 18, 19, 20, 22, 23, 24 or 25 wherein said member is relatively long in the direction of said z axis, a plurality of said stator members at spaced positions along the z axis, at each of said spaced positions there being provided: said permanent magnet means, said sensing means, said electro-magnet means and said radial air gap.

27. A linear magnetic bearing or an electromotive machine including a linear magnetic bearing, said bearing having mutually orthogonal x, y and z axes, comprising:
 a stator member stationary relative to said axes and having a longitudinal axis on the z axis;
 a member movable relative to said axes, said members being mechanically free of each other and forming a radial air gap in the plane defined by said x-y axes, said movable member adapted to have a longitudinal axis along the z axis;
 permanent magnet means on one of said members for positioning the movable member in a plane defined by the x-y axes relative to the stationary member;
 means for sensing the position of the movable member relative to the stationary member in the plane defined by the x-y axes;
 electro-magnet means on one of said members responsive to the sensing means for centering the longitudinal axis of the movable member on the z axis; and said members including means for establishing first low reluctance magnetic flux paths for the permanent magnet means through both of the members and the air gap and second low reluctance magnetic flux paths for the electro-magnets through both of the members and the air gap whereby no net force is applied to the movable member in the direction of the z axis by either the permanent magnet means or the electromagnet means, said permanent magnet means having high magnetic reluctance compared to said flux paths.

28. The magnetic bearing of claim 27 wherein a first of the members includes a pair of low reluctance elements fixedly mounted to and fixedly spaced from each other along the z axis in a pair of parallel x-y planes, said low reluctance members being parts of the first and second flux paths so that both of the elements are centered on the z axis, a second of said members having high magnetic permeability between and on opposite sides of the pair of elements.

29. The magnetic bearing of claim 28 wherein said first flux paths include at least three pole faces on each of the elements, whereby at least three radially extending permanent magnet flux routes are provided between each of the elements and the second member.

30. The magnetic bearing of claim 29 wherein the second flux paths include a pair of diametrically opposed pole faces on each of the elements whereby diametrically opposed radially extending electro-magnet flux routes are provided between each of the elements and the second member.

31. The magnetic bearing of claim 30 wherein a first pair of opposed pole faces on one of the elements intersects the x axis and a second pair of opposed pole faces on another of the elements intersects the y axis.

32. The magnetic bearing of claim 31 wherein the second flux paths on the one element include only the pole faces intersecting the x axis and the second flux paths on the other element include only the pole faces intersecting the y axis.

33. The magnetic bearing of claims 30, 31 or 32 wherein the first flux paths on each element include permanent magnet flux routes extending from one of said pole faces through the second member to the pair of diametrically opposed pole faces on the second flux path.

34. The magnetic bearing of claim 30 wherein the first flux paths on each element include permanent magnet flux routes extending from one of said pole faces through the second member to the pair of diametrically opposed pole faces in the second flux path and each element includes four mutually orthogonal pole faces, a diametric pair of said faces being provided only for the second flux paths, all of said faces being provided for the first flux paths so that permanent magnet flux routes exist between adjacent pairs of said faces and a portion of said second member.

35. The magnetic bearing of claim 34 wherein the diametric pair of pole faces on one element is oriented along the x axis and the diametric pair of pole faces on the other element is oriented along the y axis.

36. The magnetic bearing of claims 35 or 36 wherein each element includes a pair of permanent magnets diametrically polarized on the element at right angles to the diametrically opposed pole faces of the second flux paths, said pair of permanent magnets being located on opposite sides of the z axis and polarized so they tend to repel each other, whereby each permanent magnet establishes separate flux routes.

37. The magnetic bearing of claims 35 or 36 wherein each element includes a pair of electro-magnets diametrically polarized on the element in alignment with the diametrically opposed pole faces of the second flux paths, said pair of electro-magnets being located on opposite sides of the z axis and polarized so they are in series aiding relation ffor the flux of the second paths.

38. The magnetic bearing of claims 35 or 36 wherein each element includes a pair of permanent magnets diametrically polarized on the element at right angles to the diametrically opposed pole faces of the second flux paths, said pair of permanent magnets being located on opposite sides of the z axis and polarized so they tend to repel each other, whereby each permanent magnet establishes separate flux routes, a pair of electro-magnets diametrically polarized on the element in alignment with the diametrically opposed pole faces of the second flux paths, said pair of electro-magnets being located on opposite sides of the z axis and polarized so they are in series aiding relation for the flux of the second paths.

39. The magnetic bearing of claims 29, 30, 31, 32, or 33 wherein the first flux path and the permanent magnet means includes means for establishing a permanent magnet flux route in the direction of the z axis from one of the elements through the air gap to the other of the elements.

40. The magnetic bearing of claim 28 wherein the first flux path and the permanent magnet means include means for establishing a permanent magnet flux route in the direction of the z axis from one of the elements through the air gap to the other of the elements.

41. The magnetic bearing of claim 40 wherein each of the elements includes a first pair of diametrically opposed radial pole faces, the first diametric pole faces on one of the elements being oriented on the x axis, the first diametric pole faces on the other element being oriented on the y axis, the diametric pole faces being part of the second flux paths; the permanent magnet means, the electro-magnet means, the first and second elements and the first and second members being arranged so that (a) the first and second flux paths are at right angles in the x-y planes of the elements, and (b) the second flux path, while in the second member, is in the x-y planes of the elements.

42. The magnetic bearing of claim 41 wherein the first and second elements have high magnetic permeability and surround the second member in the two parallel x-y planes, the electro-magnet means including four coils spaced approximately ninety degrees from each other on each element in the x-y plane, the flux derived from first and second adjacent ones of said coils on each element being in series aiding relation, the flux derived from the third and fourth adjacent ones of said coils on each element being in series aiding relation, the flux derived from the first and third adjacent ones of said coils being in series bucking relation, the flux derived from the second and fourth ones of said coils being in series bucking relation.

43. The magnetic bearing of claim 40 wherein each of the elements includes first and second pairs of diametrically opposed radial pole faces respectively intersecting the x and y axes, the electro-magnet means including a coil for each of the pole faces, the flux derived from the coils for each pair of diametrically opposed pole faces being in series aiding relation, the electro-magnet flux derived from the coils for the diametrically opposed pole faces along one axis of one element being in series aiding relation with the permanent magnet flux in the one element, the electro-magnetic flux derived from the coils on the diametrically opposed pole faces along said one axis of a second element being in series bucking relation with the permanent magnet flux in the second of the elements.

44. The magnetic bearing of claim 43 wherein the permanent magnet means comprises a permanent magnet mounted on the first member with opposed first and second permanent magnet pole faces longitudinally disposed along the z axis, said first and second elements being located on opposite sides of said permanent magnet pole faces.

45. The magnetic bearing of claim 44 wherein the first member is concentric with and inside of the second member.

46. The magnetic bearing of claim 44 wherein the first member is concentric with and outside of the second member.

47. The magnetic bearing of claims 44 or 45 further including winding means for inducing alternating longitudinal flux in poles of the second member, said induced flux interacting with flux derived from the magnet means to drive one of said members along the z axis.

48. The magnetic bearing of claim 44 further including commutated winding means for inducing alternating longitudinal flux in poles of the second member, said induced flux interacting with flux derived from the magnet means to drive one of said members along the z axis.

49. The magnetic bearing of claim 48 wherein the second member includes four mutually orthogonal high permeability elements having circumferential and longitudinal air gaps and salient poles in x-y planes displaced along the z axis, first and second opposed facing pairs of said salient poles being on opposite sides of the x axis in a first x-y plane, the first and second pairs being on opposite sides of the z axis, third and fourth opposed facing pairs of said salient poles being on opposite sides of the y axis in a second x-y plane, the third and fourth pairs being on opposite sides of the z axis, the salient poles being arranged so that flux is coupled between adjacent salient poles of the first and second x-y planes in the z axis direction.

50. The magnetic bearing of claim 49 wherein each of the elements having salient poles includes longitudinally extending bridges between the x-y planes including the salient poles, the first member having four mutually orthogonal pole faces extending in the z axis direction for a distance equal to the salient pole face length in the z axis plus one half of the bridge length.

51. The magnetic bearing of claim 48 wherein the first member is concentric with and outside of the second member.

52. The magnetic bearing of claims 27, 28, 29, 30, 31, 32, 33, 34, 35, 40, 41, 42, 43, 44, 45, 46, 48, 49, 50 or 51 wherein said member is relatively long in the direction of said z axis, a plurality of said stator members at spaced positions along the z axis at each of said spaced positions there being provided: said permanent magnet means, said sensing means, said electro-magnet means and said radial air gap.

* * * * *